Patented Oct. 7, 1930

1,777,777

UNITED STATES PATENT OFFICE

RUDOLF WIETZEL, OF LUDWIGSHAFEN-ON-THE-RHINE, GERMANY, ASSIGNOR TO I. G. FARBENINDUSTRIE AKTIENGESELLSCHAFT, OF FRANKFORT-ON-MAIN, GERMANY, A CORPORATION OF GERMANY

MANUFACTURE OF AROMATIC DERIVATIVES OF FORMAMID

No Drawing. Application filed March 11, 1926, Serial No. 94,042, and in Germany March 13, 1925.

I have found that aryl derivatives of formamid are produced by the action of carbon monoxide at an elevated pressure on aromatic amines, which term comprises primary and secondary aromatic amines. Carbon monoxid reacts with aromatic amines at room temperature but the reaction is considerably accelerated by raising the temperature for example to from 70 to 100° C. or more and by employing catalysts. Very suitable catalysts are formic acid or its derivatives such as formates or formamid. Such compounds as under the conditions of working are transformed into derivatives of formic acid by the action of carbon monoxid under pressure may also serve as catalysts. For the sake of brevity the compounds which, under the conditions of the reaction will produce the formyl radical, together with those containing the formyl group will be referred to in the following and in the claims as "a formic acid body".

For example 100 parts, by weight, of aniline are filled into an autoclave capable of resisting high pressure, with an addition of 5 parts of methyl alcohol and 1 part of metallic sodium, and the atmosphere contained in the autoclave is replaced by gaseous ammonia. The mixture is then heated to from 180 to 200° C. and carbon monoxid or a gas rich in carbon monoxid is forced in under a pressure of 200 atmospheres. After maintaining the temperature for a few hours aniline is converted into formanilide and the product is worked up in a suitable manner. Instead of sodium and methyl alcohol a small amount of caustic soda or a concentrated solution thereof or metallic sodium or potassium alone may be used as catalysts. When working without an addition of catalysts, I prefer to add to the aniline an amount of formanilide.

The conversion of other aromatic amines for example mono-ethyl aniline into the corresponding formamid for example ethyl formanilide can be effected in a similar manner.

Instead of carbon monoxid, gases containing it such as blue gas may be used, and such gases are preferably passed through the liquid reaction mass and the waste gases are cooled before releasing the pressure of the said gases so as to condense any vapor of the reaction liquid which is returned to the autoclave.

I claim:

1. A process of manufacturing an aryl substituted formamide which comprises acting on an aromatic amine containing at least one hydrogen atom attached to the amino nitrogen, with carbon monoxide under superatmospheric pressure.

2. A process of manufacturing an aryl substituted formamide which comprises acting on an aromatic amine containing at least one hydrogen atom attached to the amino nitrogen, with carbon monoxide at a temperature of at least 70° C. and under superatmospheric pressure.

3. A process of manufacturing an aryl substituted formamide which comprises acting on an aromatic amine containing at least one hydrogen atom attached to the amino nitrogen, with carbon monoxide under superatmospheric pressure in the presence of a formic acid body as a catalyst.

4. A process of manufacturing an aryl substituted formamide which comprises acting on an aromatic amine containing at least one hydrogen atom attached to the amino nitrogen, with carbon monoxide under superatmospheric pressure and at a temperature of at least 70° C. in the presence of a formic acid body as a catalyst.

In testimony whereof I have hereunto set my hand.

RUDOLF WIETZEL.